(12) United States Patent
Kitagawa et al.

(10) Patent No.: US 8,530,087 B2
(45) Date of Patent: Sep. 10, 2013

(54) SECONDARY LITHIUM BATTERY

(75) Inventors: Kan Kitagawa, Hitachi (JP); Toyotaka Yuasa, Hitachi (JP); Tatsuya Tooyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 267 days.

(21) Appl. No.: 13/015,061

(22) Filed: Jan. 27, 2011

(65) Prior Publication Data
US 2011/0189541 A1  Aug. 4, 2011

(30) Foreign Application Priority Data

Jan. 29, 2010  (JP) ................ 2010-018121

(51) Int. Cl.
*H01M 4/62* (2006.01)
*H01M 4/50* (2010.01)
*H01M 4/52* (2010.01)

(52) U.S. Cl.
USPC ..................... 429/217; 429/221; 429/224

(58) Field of Classification Search
None
See application file for complete search history.

(56) References Cited

U.S. PATENT DOCUMENTS

| | | | | |
|---|---|---|---|---|
| 6,162,560 | A * | 12/2000 | Yamada et al. | 429/162 |
| 6,887,617 | B2 * | 5/2005 | Sato et al. | 429/128 |
| 7,753,968 | B2 * | 7/2010 | Boczer et al. | 29/623.1 |

FOREIGN PATENT DOCUMENTS

| | | |
|---|---|---|
| CN | 1881660 A | 12/2006 |
| EP | 1926162 * | 5/2008 |
| JP | 09-035707 | 2/1997 |
| JP | 11-031502 | 2/1999 |
| JP | 11-312516 | 11/1999 |
| JP | 2002-304997 | 10/2002 |
| JP | 2003-132893 | 5/2003 |
| JP | 2003-257433 | 9/2003 |
| JP | 2004-055493 | 2/2004 |
| JP | 2004-063300 | 2/2004 |

OTHER PUBLICATIONS

Notice of Rejection of Chinese Appl. No. 201110022062.9 dated Mar. 21, 2013 with English translation.

* cited by examiner

*Primary Examiner* — John S Maples
(74) *Attorney, Agent, or Firm* — Antonelli, Terry, Stout & Kraus, LLP.

(57) ABSTRACT

It is an object to provide a cathode for a secondary lithium battery in which adhesiveness and flexibility thereof are simultaneously achieved and the thickness thereof is made large, and the secondary lithium ion battery that has a large capacity and is excellent in safety and cycle life using the cathode.

The cathode includes a current collector and a cathode mixture layer formed on the surface of the current collector. The cathode mixture layer is formed by stacking two layers one on another, each of which contains a cathode active material, a conductive material and a binder, and the cathode active material contains a lithium-containing composite oxide that forms a polyanion. Of the two layers, the binder that composes a first layer that is in contact with the current collector contains a polymer formed by polymerizing at least one of monomers consisting of a monomer derived from 1-olefin and a monomer derived from a vinyl compound; and the binder that forms a second layer formed on the first layer contains a fluorine resin.

6 Claims, 2 Drawing Sheets ized by LiMPO$_4$.

SECONDARY LITHIUM BATTERY

CLAIM OF PRIORITY

The present application claims priority from Japanese Patent application serial No. 2010-018121, filed on Jan. 29, 2010, the content of which is hereby incorporated by reference into this application.

BACKGROUND OF THE INVENTION

1. Field of the Invention

The present invention relates to a secondary lithium battery.

2. Description of Related Art

Conventionally, lithium cobalt oxide is the mainstream of cathode active materials used in secondary lithium batteries, and the secondary lithium batteries employing this material are widely used. However, cobalt which is a material of the lithium cobalt oxide is small in output quantity and expensive, and hence alternate materials are being sought.

A lithium manganese oxide having a spinel structure (lithium manganese oxide spinel) which is considered as an alternate material should be further improved in terms that the discharge capacity thereof is not sufficient and Mn is dissolved at high temperature. Also, a lithium nickel oxide which is expected to improve battery capacity should be further improved in terms that the thermal stability thereof at high temperature is low.

Accordingly, a lithium-containing composite oxide which forms polyanion (hereinafter, referred to as a "polyanion cathode active material") is expected as a novel cathode active material, the polyanion having high thermal stability and being excellent in safety.

Examples of the polyanion cathode active material and the polyanion contained therein include $PO_4^{3-}$ anion contained in $LiMPO_4$, $SO_4^{4-}$ anion contained in $Li_2MSO_4$, and $BO_3^{3-}$ anion contained in $LiMBO_3$, etc., where M is any metallic element.

In particular, the most researches are focused on the lithium metal phosphate (olivine) represented by $LiMPO_4$.

Japanese Patent Laid-Open No. 2004-55493 (Patent Literature 1) discloses a cathode using a diene rubber such as styrene-butadiene rubber copolymer (SBR) etc. instead of PVDF as a binder in order to improve flexibility and smoothness and to prevent electrode-peeling and breakage from occurring.

Japanese Patent Laid-Open No. 2003-132893 (Patent Literature 2) discloses a slurry composition for an electrode using a polyvinyl resin excluding fluorine, such as polyolefin, polyvinyl alcohol and polyacrylic acid, and a copolymer thereof as a binder that has a low degree of swelling for an electrolyte solution and that is excellent in binding property.

Each of Japanese Patent Laid-Open Nos. 2004-63300, 2003-257433 and 2002-304997 (Patent Literatures 3 to 5) discloses both a secondary lithium-ion polymer battery that has a first adhesion layer between a positive current collector and a cathode active material layer and a second adhesion layer between a negative current collector and an anode active material layer, each of the first adhesion layer and the second adhesion layer containing a third binder and a conductive material, and a resin composition used in the third binder.

SUMMARY OF THE INVENTION

A cathode for a secondary lithium battery according to the present invention includes a current collector and a cathode mixture layer formed on a surface of the current collector. The cathode mixture layer is formed in two layers of a first layer and a second layer, each of which contains a cathode active material, a conductive material and a binder. The first layer is in contact with the current collector, and the second layer is formed on the first layer. The binder that composes the first layer contains a polymer excellent in binding property and oxidation resistance, and the binder that composes the second layer contains a fluorine resin excellent in flexibility.

According to the present invention, a cathode for a secondary lithium battery can be provided in which adhesiveness and flexibility thereof are simultaneously achieved and the thickness thereof is made large, and the secondary lithium ion battery that has a large capacity and is excellent in safety and cycle life can be obtained by using the aforementioned cathode.

DETAILED DESCRIPTION OF THE INVENTION

Figure 1:
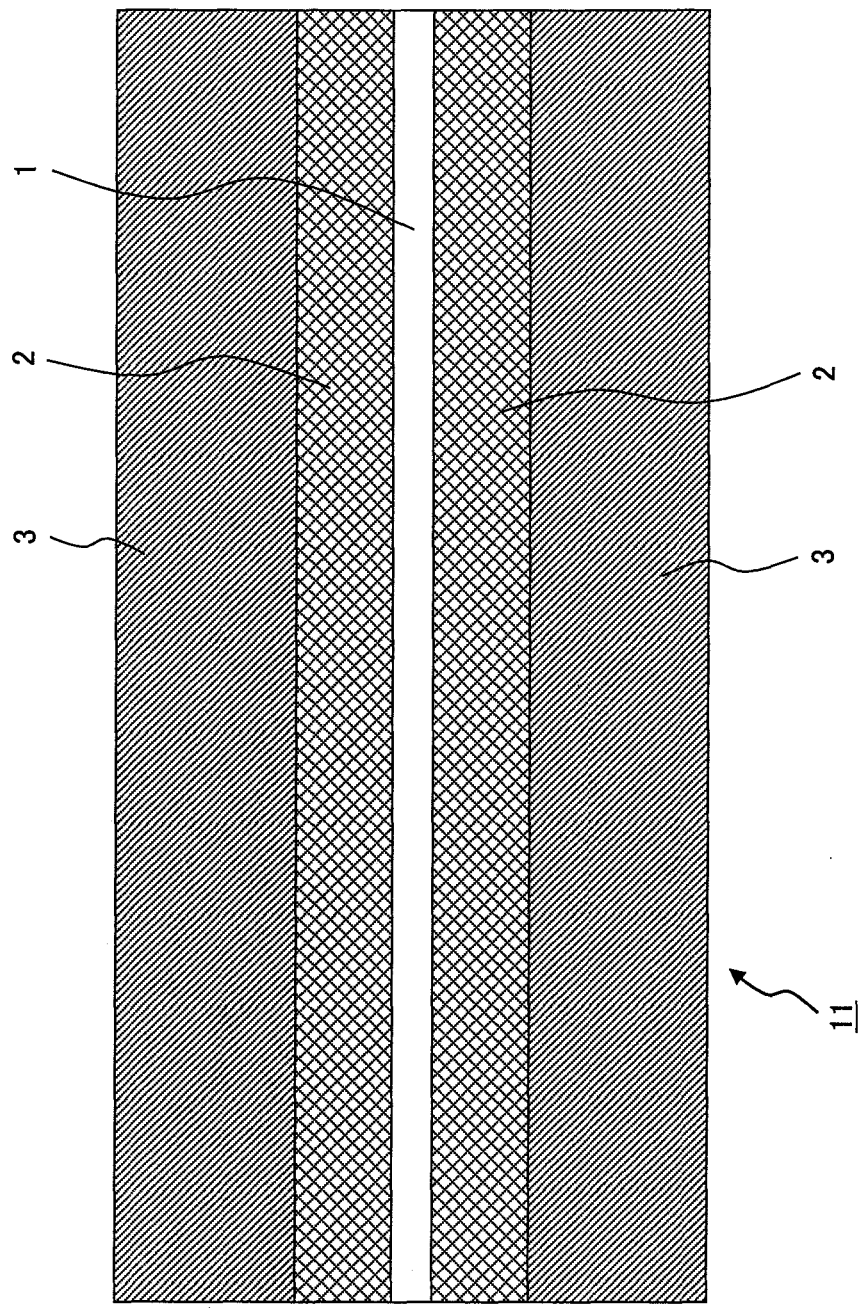
FIG. 1 is a schematic sectional view illustrating the structure of a cathode according to an embodiment of the present invention.

The present invention relates to a cathode for a secondary lithium battery and the secondary lithium battery.

An object of the present invention is to provide a cathode for a secondary lithium battery in which the thickness of a cathode mixture layer can be increased and adhesiveness and flexibility can be simultaneously achieved.

In a polyanion cathode active material, electrons are delocalized by a polyanion that is a component, and hence the polyanion cathode active material should be further improved in terms that electron conductivity is lower than a lithium-containing oxide having a layer structure which is typified by lithium cobalt oxide and that the discharge amount thereof becomes small.

As a means for improving the electron conductivity of the polyanion cathode active material, a technique is proposed in which the surface area thereof involved in a reaction is increased by making the particle size of the cathode active material (hereinafter, also simply referred to as an active material) small, and thereby the diffusion distance is made small. Also, a technique is used in which conductivity is improved by covering a surface of a cathode active material with carbon.

However, because the specific surface area of a cathode active material becomes large by making the particle size thereof small or by covering the cathode active material with carbon, the adhesiveness between the cathode active materials or between a current collector and the cathode active material is decreased when a mixture of the cathode active material, a conductive auxiliary agent and a binder is coated on the current collector. It is because a binder has to bind a larger area between particles when the specific surface area of the cathode active material is large.

Therefore, the following problems arise.

Because of a deficiency of binding force, peeling of a cathode mixture layer (hereinafter, also simply referred to as a mixture layer) from the current collector is likely to occur in the electrode production process and during use of the battery. To prevent this, the binding force and oxidation resistance of the binder need to be further improved.

In the electrode production process, a press operation is performed to enhance the density of the mixture layer and to smooth a cathode mixture layer. In this case, because the expansion coefficients of the mixture layer and the current collector are different from each other, a force causing a shear between the two is applied, thereby possibly resulting in peeling when the binding force between the two is inferior. In such a case, it becomes difficult to produce a battery.

Also, during use of a battery, a change in volume occurs with charge/discharge of the active material, thereby causing a decrease of the capacity when the binding force between the mixture layer and the current collector is weak. That is, when a microparticulated polyanion cathode active material is used as the cathode active material, the binder needs to have strong binding force.

A binder used most generally at present is a fluorine-based resin (also referred to as a fluorine resin) represented by polyvinylidene fluoride (PVDF). However, because the fluorine-based resin is inferior in the binding force with a current collector made of a metal in particular, peeling is likely to occur from the aforementioned reason when the polyanion cathode active material is used.

A diene rubber such as styrene-butadiene rubber copolymer (SBR) is known as a binder having excellent binding force and flexibility. But the binder using the rubber has an unsaturated bond. When the binder has the unsaturated bond, the oxidation resistance thereof is decreased. That is, when the binder has been used in the cathode, the binder is degraded such that the binding force is decreased because the binder is exposed to high electrical potential when the battery is charged, thereby possibly causing peeling. Polyvinyl resins and copolymers thereof without fluorine including polyolefin, polyvinyl alcohol and polyacrylic acid are proposed as binders having excellent binding force and oxidation resistance. An example of the copolymers is a copolymer of acrylonitrile and an acrylate. But a mixture layer using these binders has a disadvantage of having less flexibility than a mixture layer using a fluorine resin such as PVDF.

These problems will become more pronounced in case that the thickness of the mixture layer is made large when the polyanion cathode active material is used. Detailed reasons will be described below.

The density of the electrode using the polyanion cathode active material is lower than that of the electrode using a lithium cobalt oxide which has been conventionally employed. This is partially because the polyanion accounting for a larger percentage among the constituent elements is composed of light elements of third period or lower and thereby the true density thereof is decreased.

For example, while the true density of an olivine-type iron ($LiFePO_4$) is 3.60 $g/cm^3$, that of lithium cobalt oxide ($LiCoO_2$) is 5.05 $g/cm^3$. Accordingly the true density of the olivine-type iron is relatively low.

The fact that the packing density of an active material is decreased with the particle size thereof being made small can be taken as another reason. The decrease in the packing density occurs because the specific surface area thereof is increased with the particle size being made small and thereby the friction between the particles of the active material is increased.

When the density of the mixture layer is low, the thickness thereof needs to be made large to enhance the capacity per volume of the battery, and the mixture layer needs to have sufficient flexibility to produce an electrode having a large thickness. It is because a stress is applied to the mixture layer when the electrode is being wound in producing the battery, and when the thickness of the mixture layer is made large, the difference in stress between the proximity of the surface of the mixture layer and that of the current collector becomes large, and hence a portion that is greatly extended is caused in the proximity of the surface of the mixture layer.

It has been learned that breakage may occur when the mixture layer does not have sufficient flexibility in this case. The breakage that has occurred may cause peeling, and hence it becomes difficult to produce the battery.

Even if peeling is not caused, fine cracks are created in the mixture layer, and hence the conductivity of the electrode is decreased.

From the aforementioned reasons, the thickness of the mixture layer needs to be made large to enhance the capacity of the battery when the polyanion cathode active material is used. In the case, it is needed that a binder is excellent in flexibility.

Also, it is needed to compress the mixture layer by a press operation to reduce the resistance of the mixture layer because the distance between the current collector and the active material becomes large by the thickness of the mixture layer being made large. As stated above, because peeling may occur in the electrode whose adhesive force is weak during the press operation, it is also needed that the binder has strong adhesiveness in the electrode having a large thickness.

As stated above, it is needed that a binder simultaneously has binding force, flexibility and oxidation resistance. However, the binder has advantages and disadvantages in characteristics as stated above.

We have developed a technique for solving these problems, in which various binders are selectively used in accordance with portions where the characteristics of the selected binders are needed.

That is, focusing attention on that the portion where binding force is need is the interface with the current collector, we have used two cathode mixture layers, and have used a binder excellent in the binding force and the oxidation resistance as a binder in a first layer that is in contact with the current collector. In this case, the binders can be suitably used by restricting the thickness of the first layer so as not to create breakage when being wound, even if the flexibility of the binder of the first layer is inferior.

When a second layer is formed on the first layer by using a binder excellent in flexibility, breakage occurring due to deformation can be prevented. Further, peeling can be prevented because the binding force needed between the two active material layers is smaller than that needed on the interface with the current collector.

FIG. 1 is a schematic sectional view illustrating a structure of a cathode according to an Example.

In FIG. 1, a cathode 11 includes a current collector 1, a first layer 2 and a second layer 3.

The first layer 2 is formed on a surface (both surfaces) of the current collector 1, and the second layer 3 is formed on the first layer 2. Each of the first layer 2 and the second layer 3 contains a cathode active material, a conductive material and a binder.

A polyanion cathode active material is used as the cathode active material.

A binder excellent in binding force and oxidation resistance is used in the first layer 2. A binder excellent in flexibility is used in the second layer 3.

This structure enables peeling and breakage not to occur in the cathode 11.

It is desirable that a continuous coating method is adopted as a coating method, in which the second layer 3 is coated in a wet state where the first layer 2 is not completely dried. This is because the adhesiveness between the first layer 2 and the second layer 3 is improved with the first layer 2 and the second layer 3 being contacted with each other in the wet state such that components in the two layers are mutually diffused near the interface.

Figure 2:
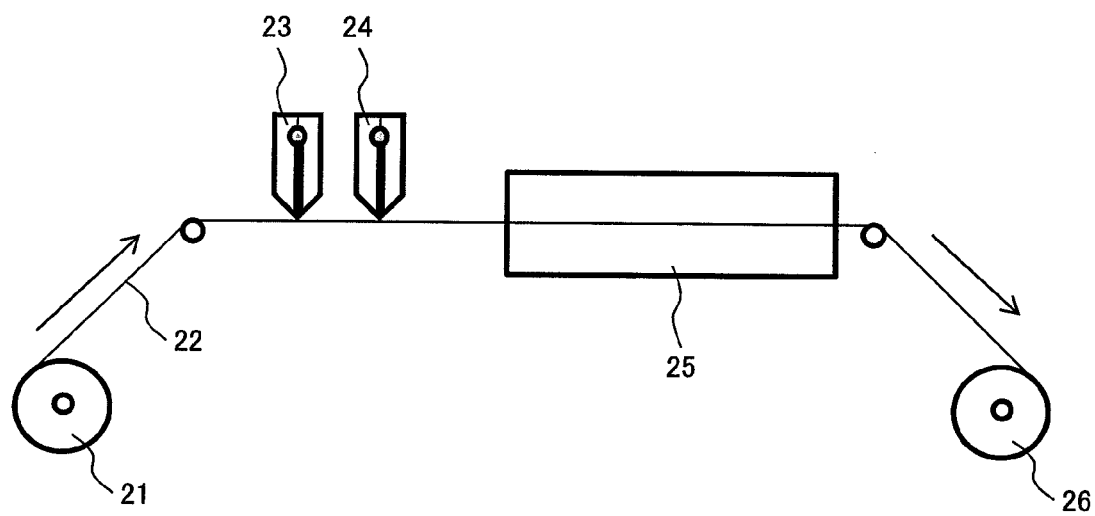
FIG. 2 is a schematic configuration view illustrating a coating apparatus for the cathode according to an embodiment of the present invention.

FIG. 2 is a schematic configuration view illustrating a coating apparatus for the cathode according to an embodiment.

The coating apparatus illustrated in FIG. 2 has a first layer coating portion 23, a second layer coating portion 24 and a drying furnace 25.

The first layer is coated on a surface of a current collector 22 (made of aluminum alloy) which has been wound out from a current collector roll 21 in the first layer coating portion 23, and the second layer is coated in the second layer coating portion 24, not through a drying process.

Subsequently, after a drying process in which the first layer and the second layer (hereinafter, also referred to as both layers) are dried in the drying furnace 25, the current collector 22 (cathode) on which the first layer and the second layer are formed (that is, a cathode) is wound as a cathode roll 26.

When the continuous coating is to be performed in a wet state, it is desirable that the thickness of the first layer is made to be 15 μm or greater because strong binding force can be obtained.

We consider that this occurs due to the following reason.

The polyanion cathode active material is used after a particle size thereof has been made small. Accordingly, when a slurry for an electrode coating is produced by using the particles of the polyanion cathode active material, the viscosity thereof becomes high in comparison with a case where the particles of the active material the size of which is not required to be made small are used.

It is needed to add a dispersion solvent such as NMP or water excessively to reduce the viscosity of the slurry. As a result, the ratio of the solid (particles) contained in the slurry becomes low.

On condition that the first layer formed by a slurry having such a low solid ratio and coated to have a small thickness is in the wet state, if a slurry for the second layer also having a low solid ratio is coated in a large amount, the components in both of the layers are diffused, and hence the first layer cannot hold sufficient binding force. As a result, there arise the problems regarding peeling in an electrode production process and deterioration of a battery.

To solve these problems, the thickness of the first layer is made to be 15 μm or greater, and thereby the decrease in the binding force occurring due to the diffusion of the components in both of the layers is prevented.

Hereinafter, descriptions will be made with respect to a cathode for a secondary lithium battery according to an embodiment of the present invention, the secondary lithium battery, and a method of producing the cathode for the secondary lithium battery.

The cathode for the secondary lithium battery includes a current collector and a cathode mixture layer formed on the surface of the current collector. The cathode mixture layer is formed by stacking two layers one on another, each of which contains a cathode active material, a conductive material and a binder. Of the two layers, The binder composing a first layer that is in contact with the current collector contains a polymer formed by polymerizing at least one of monomers consisting of a monomer derived from 1-olefin and that derived from a vinyl compound; and the binder composing a second layer formed on the first layer contains a fluorine resin.

In the cathode for the secondary lithium battery, the cathode active material contains a lithium-containing composite oxide that forms a polyanion.

In the cathode for the secondary lithium battery, the cathode active material is a lithium-containing compound oxide phosphate having an olivine structure which is represented by $LiMPO_4$ (where M is one or more elements selected from the group consisting of Li, Fe, Ni, Co, Ti, Cu, Zn, Mg and Zr).

In the cathode for the secondary lithium battery, the binder that forms the first layer contains a copolymer of acrylonitrile and acrylic acid ester, and the binder that forms the second layer contains polyvinylidene fluoride.

In the cathode for the secondary lithium battery, the thickness of the first layer is within a range of 15 to 60 μm and the total thickness of the first layer and the second layer is within a range of 80 to 150 μm.

The secondary lithium battery uses the cathode.

The method for producing the cathode for the secondary lithium battery, the cathode including a current collector and a cathode mixture layer formed on the surface of the current collector in which the cathode mixture layer is formed by stacking two layers one on another each containing a cathode active material, a conductive material and a binder, and the cathode having a configuration in which a first layer in contact with the current collector and a second layer formed on the first layer are laminated, comprises the steps of forming the first layer containing a polymer formed by polymerizing at least one of monomers consisting of a monomer derived from 1-olefin and a monomer derived from a vinyl compound as a binder; and forming the second layer containing a fluorine resin as a binder.

In the forming a second layer of the method, the second layer is formed on the first layer that is in a wet state.

Hereinafter, members that form the secondary lithium battery will be described in detail.

(Cathode)

The cathode includes a cathode active material, a binder and a current collector. Alternatively, a conductive auxiliary agent may be further added to cover the electron conductivity if necessary.

Hereinafter, members that form the cathode and the structure thereof will be described in detail.

(Cathode Active Material)

The cathode active material (hereinafter, also simply referred to as an active material) is a polyanion cathode active material excellent in thermal stability. Herein, the polyanion cathode active material is characterized in that it forms a polyanion in which an oxygen atom is bound with another element by a covalent bond.

Specifically, examples of the polyanion include $LiMPO_4$, $Li_2MSO_4$ and $LiMBO_3$ (where M is one or more elements selected from the group consisting of Li, Fe, Ni, Co, Ti, Cu, Zn, Mg and Zr).

Although these polyanion cathode active materials are characterized in that they are inferior in electron conductivity, they are preferred because the electron conductivity thereof which is a defect of these materials can be covered by being used after compounded with carbon. Further, it is desirable that the specific surface area of the cathode active material is made to be 15 $m^2/g$ or greater to improve the electron conductivity and ion conductivity.

However, if the specific surface area is too high, an aggregate is generated when an electrode is being produced, thereby an electrode with smooth surface cannot be obtained.

Further, the packing density of an electrode is decreased and accordingly the energy density thereof is decreased. Therefore, it is desirable that the specific surface area thereof is 100 m²/g or smaller.

Of the aforementioned polyanion cathode active materials, the olivine cathode active material represented by LiMPO$_4$ is promising at present because it shows excellent characteristics in the capacity and cycle life of the battery.

(Binder)

In order to produce a cathode excellent in adhesiveness and flexibility by using the polyanion cathode active material and to obtain a battery having a large capacity and long life by using the cathode, it is needed to improve the adhesiveness and oxidation resistance on the interface between the current collector and the cathode mixture layer (hereinafter, also simply referred to as a mixture layer), and to provide the flexibility that prevents breakage and cracks from occurring in a winding process, etc., even when the thickness of the mixture layer is made large.

To achieve this, the cathode mixture layer is divided into two layers, and the binder excellent in binding force and oxidation resistance is used in the first layer formed to be in contact with the current collector, and the binder excellent in flexibility is used in the second layer formed on the first layer.

Examples of the binder used in the first layer include monopolymers or copolymers, the monomer of which is 1-olefin or a vinyl compound excluding a fluorine atom.

Specifically, examples of 1-olefin include ethylene, 1-hexene, 1-propene, etc. Examples of acrylate (methacrylate) that is a kind of vinyl compound excluding the fluorine atom include alkyl(meth)acrylates such as methyl(meth)acrylate and lauryl(meth)acrylate, etc.; hydroxy acrylic(meth)acrylates such as 2-hydroxyethyl(meth)acrylate and 2-hydroxypropyl(meth)acrylate, etc.; and amino alkyl(meth)acrylates such as aminomethyl(meth)acrylate, N,N-dimethylaminoethyl(meth)acrylate, etc. Examples of styrene derivative include styrene vinyl toluene and α-methylstyrene, etc.

Examples of other vinyl derivative include vinyl acetate and vinyl chloride, etc. Examples of carboxylic acid include acrylic acid and methacrylic acid. Example of the (meth) acrylic acid derivative includes (meth)acrylonitrile.

The monomer having a nitrile group such as acrylonitrile, methacrylonitrile or the like is particularly preferred because it is excellent in adhesiveness and oxidation resistance. In addition, in order to improve flexibility, a monomer containing an ester group represented by the following formula (1) is particularly preferred.

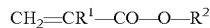

$$CH_2=CR^1-CO-O-R^2 \qquad \text{[Formula 1]}$$

Where, $R^1$ is hydrogen atom or methyl group and $R^2$ is an alkyl group. When the number of carbons of $R^2$ is large, flexibility is improved, and when the number thereof is small, binding property is improved. The number thereof should not particularly limited to, but be selected in accordance with aim. From the viewpoint of the balance between the aforementioned flexibility and binding property, the number of carbons of $R^2$ is preferably within a range of 4 to 20, and more preferably within a range of 8 to 16.

Although the binder formed by polymerizing a monomer containing a nitrile group such as acrylonitrile, etc. is excellent in adhesiveness; however, because the binder is a rigid polymer, the flexibility of the cathode mixture layer is inferior, thereby causing the problems regarding the aforementioned cracks and breakage. However, flexibility can be provided thereto by copolymerizing with a monomer having a side chain represented by the above formula (1), and accordingly the thickness of the first layer can be made large.

As the binder used in the second layer, a fluorine-based resin is suitably employed. It is because a fluorine resin has excellent flexibility.

Examples of a fluorine-based resin include polyvinylidene fluoride (PVDF), polytetrafluoroethylene, and modified materials formed by copolymerizing these materials with another monomer. In particular, PVDF or a modified material thereof is preferred.

It is desirable that the concentration of the binder in each of the layers is 3% by weight or higher to obtain sufficient binding force. If the concentration of a binder is too high, flexibility is lost in the first layer. Also, if the concentrations of binders in both of the layers are too high, electrical resistance is increased and the concentration of the cathode active material contained in the cathode mixture is decreased, and hence the energy density of the battery is decreased. Accordingly, the concentration of a binder in each of the layers is preferably 10% by weight or smaller.

(Conductive Auxiliary Agent)

A carbon-based material such as acetylene black, graphite powder or the like can be used as a conductive auxiliary agent.

Because the polyanion cathode active material having a large specific surface area is used, it is desirable that the conductive auxiliary agent has a large specific surface area to form a conductive network, and specifically acetylene black, etc. is preferred.

When the cathode active material is to be covered with carbon, it is desirable that the total amount of covering carbon and a conductive auxiliary agent to be added is within a range of 5 to 10% by weight. When the total amount is smaller than 5% by weight, the conductivity between the active materials or between the active material and the current collector is decreased. In contrast, when the total amount is greater than 10% by weight, the energy density of the electrode is decreased.

(Thickness of Mixture Layer)

It is desirable that the total of the thickness of each of the mixture layers (a mixture layer thickness) is within a range of 80 to 150 μm to make the capacity of a battery large. Herein, the mixture layer means a cathode mixture layer and the mixture means a cathode mixture.

It is not desirable that the total of the thickness of each of the mixture layers is smaller than 80 μm because the energy density of the battery cannot be enhanced. Also, it is not desirable that the total of the thickness of each of the mixture layers is greater than 150 μm because the wrinkles occurs in the electrode production process and because the discharge capacity of the battery is decreased due to the distance with a current collector becoming large. It is particularly desirable that the total of the thickness of each of the mixture layers is made to be within a range of 90 to 130 μm.

It is desirable that the thickness of the first layer is 15 μm or greater to obtain sufficient binding force. Also, it is desirable that the thickness of the first layer is 70 μm or smaller to prevent breakage or cracks from occurring when an electrode is being wound. It is particularly desirable that the thickness thereof is made to be within a range of 30 to 50 μm.

The thickness of the mixture layer referred to herein means the distance from the current collector to the outer surface of the mixture layer, that is the thickness thereof means the thickness of the mixture layer on one surface of the current collector, although the mixture is usually coated on both surfaces of the current collector.

As the current collector, a support member having conductivity, such as aluminum foil, etc. can be used in accordance with application.

(Anode)

An anode mixture is produced by mixing an anode active material, a conductive auxiliary agent and a binder, etc.

Any active material can be used as the anode active material, as long as the active material can reversibly occlude/discharge Li by charge/discharge of the battery. Examples of the active material include a carbon material, metallic oxide, metallic sulfide, lithium metal, and alloy of lithium metal and another metal. As the carbon material, graphite, amorphous carbon, corks, thermal cracking carbon, etc. can be used.

Any publicly-known conductive auxiliary agent can be used as the conductive auxiliary agent, examples of which include carbon-based conductive auxiliary agents such as acetylene black and graphite powder, etc. Similarly, any publicly-known binder can be used as the binder, examples of which include PVDF, SBR (Styrene-Butadiene Rubber), NBR (Nitrile Butadiene Rubber) and acrylonitrile, etc.

(Separator)

A publicly-known separator can be used as the separator, without any particular limitation. Examples of the separator include polyolefin-based porous membranes such as polypropylene porous membrane and polyethylene porous membrane, etc., and glass fiber sheet, etc.

(Electrolyte)

As the electrolyte, lithium salts such as $LiPF_6$, $LiBF_4$, $LiCF_3SO_3$, $LiN(SO_2CF_3)_2$, $LiN(SO_2F)_2$, etc. can be used alone or in combination thereof.

Examples of a solvent for dissolving a lithium salt include a chain carbonate, a cyclic carbonate, a cyclic ester, and a nitrile compound, etc.

Specifically, ethylene carbonate, propylene carbonate, diethyl carbonate, dimethoxyethane, γ-butyrolactone, n-methyl pyrrolidine, and acetonitrile, etc. can be used. In addition to them, a polymer gel electrolyte and a solid electrolyte can also be used.

Batteries of various forms, such as cylindrical battery, angular battery, and laminated battery, etc. can be configured by using the aforementioned cathode, anode, separator and electrolyte.

The present invention will now be described in detail with reference to Examples; however, the invention should not be limited by these Examples, unless the gist of the invention is exceeded.

Example 1

(Synthesis of Active Material)

$NH_4H_2PO_4$, $LiOH.H_2O$, $MnC_2O_4.2H_2O$ and $FeC_2O_4.2H_2O$ were mixed in a molar ratio of 1:1:0.5:0.5 in order to synthesize $LiMn_{0.5}Fe_{0.5}PO_4$. Then, dextrin was added thereto in an amount of 12% by weight, and this mixture was mixed using a planetary ball mill to make mixed powder. The mixed powder was calcined at 400° C. for ten hours under argon flow at 0.3 L/min.

The calcined powder was once ground and burned again at 700° C. for ten hours under argon flow at 0.3 L/min.

The powder obtained after the burning was ground and the particle size thereof was adjusted by a sieve with 45 μm mesh to obtain the material represented by the composition formula of $LiMn_{0.5}Fe_{0.5}PO_4$.

The obtained material was subjected to X-ray diffraction analysis using RINT2000 (Made by Rigaku Corporation) to confirm that this material belongs to an olivine structure (space group Pmna).

In order to evaluate the powder properties of the obtained material, the specific surface area of the active material was measured according to the following method.

The specific surface area can be measured with a publicly-known BET specific surface area analyzer for powder.

In the present Example, the specific surface area of each active material was measured by using the specific surface area analyzer BELSORP-mini (made by BELL JAPAN, INC.). The measurements were conducted at liquid nitrogen temperature and using $N_2$ as an adsorption gas.

(Electrode Coating)

Subsequently, an electrode mixture (paint) was produced using this cathode active material. The slurry for the first layer and that for the second layer were produced by mixing materials in amounts described below, respectively.

For the slurry for the first layer, $LiMn_{0.5}Fe_{0.5}PO_4$ synthesized in the previous clause, acetylene black, and an acrylonitrile copolymer were used as an active material, a conductive auxiliary agent and a binder, respectively.

The active material, the conductive auxiliary agent and the binder were weighed such that a weight ratio of them was 83:9.5:7.5, and mixed together.

It was assumed that the weight of the active material was that of the active material alone excluding covering carbon, and assumed that the weight of the conductive auxiliary agent was the total weight of the covering carbon and the newly added acetylene black.

In the present Example, an acrylonitrile-based copolymer was a copolymer in which acrylonitrile and laurylacrylate were copolymerized in a weight ratio of 9:1, and used after being dispersed in N-methyl-2-pyrrolidone (NMP).

N-methyl-2-pyrrolidone was added as a dispersant in order to adjust the viscosity, and the mixture was stirred using a kneading machine to obtain the slurry for the first layer.

The slurry for the second layer was produced with the composition and the mixing method thereof being made the same as those of the slurry for the first layer, except that PVDF was used as the binder.

While the solid ratio in the slurry for the first layer was 0.31, the solid ratio in the slurry for the second layer was 0.28.

The outline of the electrode coating process is as follows:

The slurry for the first layer was first coated on the surface of an aluminum current collector having a thickness of 20 μm by using a die coater such that the thickness after drying process of the first layer was made to be 40 μm; and subsequently the slurry for the second layer was coated on the first layer which was in a wet state by using a die coater such that the thickness after drying process of the second layer was made to be 60 μm.

After the slurry was dried, the same coating was made on the other surface of the aluminum current collector. After the slurry was dried, the aluminum current collector was pressed to obtain a cathode electrode sheet.

The thickness of the slurry coated on each of the first layer and the second layer was determined in the following way: the slurry was coated so as to have multiple thickness; and the thickness of the mixture layer on each small specimen pressed after the slurry was dried was measured to make a calibration curve.

Bending tests and peeling tests for the produced electrodes were conducted to evaluate the mechanical properties thereof.

(Flexibility Measurement (Bending Test))

The bending test was conducted for a specimen having a size of 10×3 cm that was cut off from the produced electrode sheet, according to the test method specified in JIS-K5600 5-1.

As a result of the measurement of the thickness of the electrode, it was found that the thickness of every electrode was 300 μm or smaller, which was suitable for the test using the type 1 apparatus specified in JIS-K5600 5-1.

The test was conducted at an interval of 1 mm when the diameter of the mandrel was changed from 10 mm to 2 mm, and the diameter thereof when cracks first occurred was recorded. Visual observation was conducted. It can be said that the larger the diameter of the mandrel, the less flexible is the specimen. The electrode in which cracks had never occurred even when the diameter was 2 mm was evaluated as ○ (good).

(Peeling Test (Press Test))

A specimen was cut off from the produced electrode sheet so as to have a circular shape having a diameter of 15 mm, and subjected to hydraulic press to observe the state of the specimen.

The pressure was increased stepwise by 20 MPa, and the pressure at which peeling had occurred was recorded. The specimen in which peeling had never occurred even at the pressure of 200 MPa was evaluated as ○ (good).

A 18650 battery (18 mm in diameter×650 mm in height) was produced by using the produced cathode.

Regarding the anode, a slurry for the anode was obtained in the following way: graphite, carbon black and PVDF were used as an anode active material, a conductive material and a binder, respectively, and mixed in a weight ratio of 92.2:1.6:6.2; and subsequently the mixture was stirred using the kneading machine to obtain the slurry for the anode. The kneaded slurry was coated on both surfaces of a copper foil having a thickness of 10 μm by using a coater. After the slurry was dried, the copper foil was pressed with a roll press to obtain the anode.

Each of the cathode and the anode was cut into a predetermined size, and a current collector tab (cathode lead and anode lead) was connected by ultrasonic welding to the portion in each of the cathode and the anode where the slurry was not coated.

After a microporous polyethylene film separator interposed between these cathode and anode was wound in a cylindrical form, this assembly was inserted into the 18650 battery can. After the current collector tab and the cover of the battery can were connected, the cover of the battery and the battery can were welded to seal the battery.

Finally, an electrolyte solution (EC/EMC (2/1) solution containing 1M of $LiPF_6$ as an electrolyte) was fed from the feeding port provided on the battery can to obtain the 18650 battery. Herein, EC/EMC (2/1) represents a solvent in which EC and EMC have been mixed in a ratio of 2:1.

Figure 3:
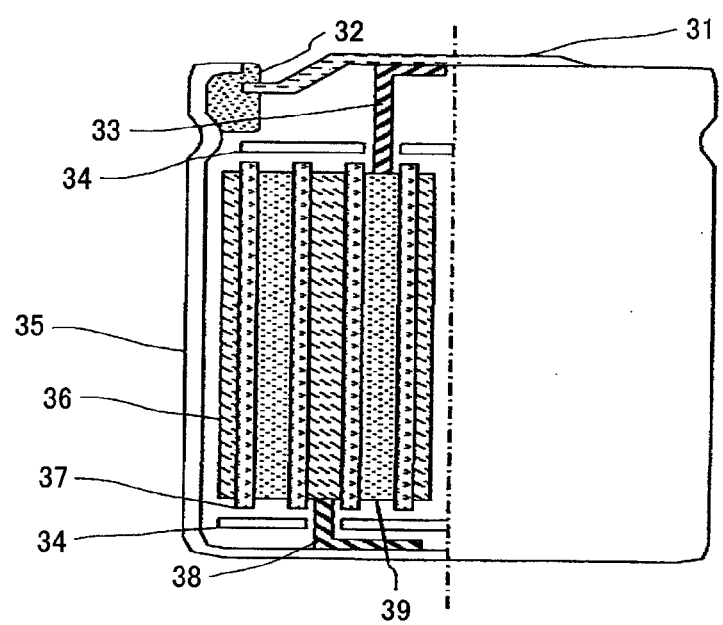
FIG. 3 is a partial sectional view illustrating a secondary lithium battery according to an embodiment of the present invention.

FIG. 3 is a partial sectional view illustrating a secondary lithium battery according to an Example.

The secondary lithium battery (also simply referred to as a battery) illustrated in FIG. 3 has a configuration (group of electrodes) in which a separator 37 is sandwiched between a cathode 39 and an anode 36 and wound. The group of electrodes is enclosed into a battery can 35 along with an electrolyte. The battery can 35 is sealed by a battery cover 31 and a gasket 32. An insulating plate 34 is provided at both ends of the group of electrodes such that the group of electrodes is not in contact with the battery can 35 and the battery cover 31.

A cathode lead 33 is provided in the cathode 39 and an anode lead 38 is provided in the anode 36. The cathode lead 33 and the anode lead 38 are respectively connected with the battery cover 31 and the battery can 35 to output electricity outside the battery.

(Capacity Test)

The capacity of the battery was measured in the following way: the battery was charged with a constant current/a constant voltage at a charge rate of 0.1 C to 4.3 V, and later was discharged with a constant current at a discharge rate of 0.1 C.

(Rate Test)

A rate test was conducted in the following way: the battery was charged with a constant current/a constant voltage at a charge rate of 0.1 C to 4.3 V, and later was discharged with a constant current at a discharge rate of 3 C. A specific capacity (%) was determined by dividing the discharge capacity in the above rate test by the discharge capacity in the above capacity test.

(Cycle Test)

A cycle test was conducted by using the produced 18650 battery.

Evaluation was made by executing 100 cycles of charge/discharge at a current value of 0.1 C. The discharge capacity at the first cycle was made to be 100% and a specific capacity (%) at the one hundredth cycle was determined, and this specific capacity was defined as a cycle life.

The results of Example 1 will be summarized below.

The specific surface area of the active material was 46 $m^2/g$. It can be said that this value is greater than that of a lithium cobalt oxide which is currently the mainstream.

In the flexibility measurement (bending test), there occurred no cracks, and there occurred no peeling in the press test.

From the aforementioned results, it has been learned that the electrode is excellent in flexibility and adhesiveness.

Because the thickness of the mixture layer on one surface was made to be as thick as 100 μm, the capacity of the battery was as high as 810 mAh.

Also, the result of the rate test showed that the specific capacity of the battery was 80%, which was high. It can be thought that this is because the conductivity is improved by the particle size being made small and further the mixture layer is fully pressed and hence the resistance inside the mixture is reduced.

The capacity maintenance rate after 100 cycles in the cycle test was 99%, which showed that the battery was excellent in cycle life. This is because the adhesiveness between the current collector and the mixture layer is maintained even after cycles over a long period of time.

The results occurring when the same active material and binder as ones used in Example 1 were used and the thickness of the mixture layer was changed are illustrated in Examples 2 and 3 and Comparative Examples 1 to 3.

Example 2

An electrode was produced in the same way as in Example 1, except that the thickness of the first layer was made to be 15 μm and that of the second layer was made to be 65 μm.

In the flexibility measurement (bending test), there occurred no cracks, and also, there occurred no peeling in the press test.

The capacity of the battery was 760 mAh.

The result of the rate test showed that the specific capacity of the battery was 84%, and the capacity maintenance rate after 100 cycles in the cycle test was 99%.

Example 3

An electrode was produced in the same way as in Example 1, except that the thickness of the first layer was made to be 60 μm and that of the second layer was made to be 90 μm.

In the flexibility measurement (bending test), no cracks were observed, and also, there occurred no peeling in the press test.

The capacity of the battery was 850 mAh.

The result of the rate test showed that the specific capacity of the battery was 71%, and the capacity maintenance rate after 100 cycles in the cycle test was 98%.

In Examples 2 and 3, it is learned that the electrode (mixture layer) is excellent in adhesiveness and flexibility; and from the results of the cycle test, it is learned that the adhesiveness is maintained without the binder being deteriorated even after cycles over a long period of time.

Also, the capacity and the rate are both high.

In Example 2, because the thickness of the mixture layer is smaller than that in Example 1, the capacity is decreased. On the other hand, because the thickness thereof is larger than that, the capacity is increased in Example 3.

In Example 2, because the thickness of the mixture layer is smaller than that in Example 1, the rate is higher than that in Example 1. On the other hand, because the thickness of the mixture layer is thick, the rate is slightly low, but a sufficient value in Example 3.

Comparative Example 1

An electrode was produced in the same way as in Example 1, except that the thickness of the first layer was made to be 5 μm and that of the second layer was made to be 95 μm.

In the flexibility measurement (bending test), there occurred no cracks, but there occurred peeling of the mixture layer at 60 MPa in the press test.

The 18650 battery was not able to be produced because there occurred uplift and peeling of the mixture layer at the end of the electrode during the press process in the battery production process.

Comparative Example 2

An electrode was produced in the same way as in Example 1, except that the thickness of the first layer was made to be 90 μm and that of the second layer was made to be 10 μm.

In the flexibility measurement (bending test), there occurred cracks when the diameter of the mandrel was 8 mm. In the press test, there occurred no peeling. The 18650 battery was not able to be produced because there occurred big cracks during the winding process in the battery production process.

Comparative Example 3

An electrode was produced in the same way as in Example 1, except that the thickness of the first layer was made to be 60 μm and that of the second layer was made to be 140 μm.

In the flexibility measurement (bending test), there occurred no cracks, and also, there occurred no peeling in the press test.

The capacity of the battery was 860 mAh.

The result of the rate test showed that the specific capacity of the battery was 51%, and the capacity maintenance rate after 100 cycles in the cycle test was 85%.

In Comparative Example 1, because the thickness of the first layer was too small, the components in the first layer were diffused into the second layer, thereby not allowing sufficient binding force to be obtained.

In Comparative Example 2, because the thickness of the first layer was too large, the flexibility of the electrode was low such that there occurred cracks, and hence the electrode was not suitable for battery production.

In Comparative Example 3, sufficient binding force and flexibility were obtained.

In Comparative Example 3, however, the original capacity consistent with the amount of the active material was not able to be obtained, although the capacity of the battery was slightly increased due to making the thickness of the mixture layer large. It can be thought that this was because the resistance of the battery was increased due to making the thickness thereof large.

This is also shown in the result of the rate test in which the rate property was insufficient.

The result in the cycle test also showed a value lower than those in Examples 1 to 3. It can be thought that this is because the thickness of the mixture layer was too large, and hence strain was accumulated in the mixture layer when the mixture layer was being pressed or wound, and thereby the internal structure collapsing due to a change in volume with charge/discharge of the battery.

Example 4

An electrode was produced in the same way as in Example 1, except that the binder used in the first layer was changed to an ethylene-ethyl acrylate copolymer (ethylene:ethyl acrylate=1:9).

In the flexibility measurement (bending test), there occurred no cracks, and also, there occurred no peeling in the press test.

The capacity of the battery was 845 mAh.

The result of the rate test showed that the specific capacity of the battery was 75%, and the capacity maintenance rate after 100 cycles in the cycle test was 98%.

In Example 4, although the binder was changed to ethylene-hexyl acrylate which is a copolymer of 1-olefin and acrylate, the same adhesiveness as other Examples was shown.

Comparative Example 4

An electrode was produced in the same way as in Example 1, except that the binder in the first layer was changed to PVDF.

In the flexibility measurement (bending test), there occurred no cracks, but there occurred peeling of the mixture layer at 40 MPa in the press test. The 18650 battery was not able to be produced because there occurred uplift and peeling of the mixture layer at the end of the electrode during the press process in the battery production process.

Comparative Example 5

An electrode was produced in the same way as in Example 1, except that the binder in the second layer was changed to an acrylonitrile copolymer.

In the flexibility measurement (bending test), there occurred cracks when the diameter of the mandrel was 10 mm. In the press test, there occurred no peeling. The 18650 battery was not able to be produced because there occurred big cracks during the winding process in the battery production process.

In Comparative Examples 4 and 5, an electrode was produced using a single binder.

In Comparative Example 4, binding force was insufficient, and in Comparative Example 5, flexibility was insufficient.

Example 5

NH$_4$H$_2$PO$_4$, LiOH.H$_2$O, and FeC$_2$O$_4$.2H$_2$O were mixed in a molar ratio of 1:1:1 in order to synthesize LiFePO$_4$. Then, dextrin was added thereto in an amount of 12% by weight, and this mixture was mixed using a planetary ball mill to make mixed powder. The mixed powder was calcined at 400° C. for ten hours under argon flow at 0.3 L/min. The calcined powder was once ground and burned again at 700° C. for ten hours under argon flow at 0.3 L/min.

The powder obtained after the burning was ground and the particle size thereof was adjusted by a sieve with 45 μm mesh to obtain the material represented by the composition formula of LiFePO$_4$.

The obtained material was subjected to X-ray diffraction analysis using RINT2000 (Made by Rigaku Corporation) to confirm that this material has an olivine structure (space group Pmna).

An electrode was produced in the same way as in Example 1, except that LiFePO$_4$ produced in the aforementioned procedure was used as an active material.

As a result of measuring the specific surface of the active material, the specific surface area thereof was 38 m$^2$/g.

In the flexibility measurement (bending test), no cracks were observed, and also, there occurred no peeling in the press test. The capacity of the battery was 830 mAh. In addition, the result of the rate test showed that the specific capacity of the battery was 90%, and the capacity maintenance rate after 100 cycles in the cycle test was 99%.

In Example 5, LiFePO$_4$ was used as an active material having an olivine structure.

Although the material had a large specific surface area, the produced electrode had both sufficient adhesiveness and sufficient flexibility. Also, the electrode showed high performance with respect to each of capacity, rate property and life.

Comparative Example 6

An electrode was produced in the same way as in Example 1, except the LiMnO$_4$ was used as the cathode active material and PVDF was used as the binder in each of the first layer and the second layer.

The specific surface area of LiMnO$_4$ was 1.3 m$^2$/g. The solid ratio in the produced slurry was 0.62.

In the flexibility measurement (bending test), no cracks were observed, and also, there occurred no peeling in the press test.

The capacity of the battery was 870 mAh. In addition, the result of the rate test showed that the specific capacity of the battery was 91%, and the capacity maintenance rate after 100 cycles in the cycle test was 95%.

In Comparative Example 6, LiMnO$_4$ that is an active material having a small specific surface area was used.

Although PVDF was used as the binder in each of the first layer and the second layer, there occurred no peeling and there was no problem in the battery production process.

In Table 1, the configurations of Examples and Comparative Examples are summarized.

In Table 2, the test results of Examples and Comparative Examples are summarized.

TABLE 1

|  | Thickness of first layer[μm] | Thickness of second layer[μm] | Thickness of mixture layer[μm] | Binder in first layer | Binder in second layer | Cathode active material |
|---|---|---|---|---|---|---|
| Example 1 | 40 | 60 | 100 | Acrylonitrile copolymer | PVDF | LiMn$_{0.5}$Fe$_{0.5}$PO$_4$ |
| Example 2 | 15 | 65 | 80 | Acrylonitrile copolymer | PVDF | LiMn$_{0.5}$Fe$_{0.5}$PO$_4$ |
| Example 3 | 60 | 90 | 150 | Acrylonitrile copolymer | PVDF | LiMn$_{0.5}$Fe$_{0.5}$PO$_4$ |
| Example 4 | 40 | 60 | 100 | Ethylene-hexyl acrylate copolymer | PVDF | LiMn$_{0.5}$Fe$_{0.5}$PO$_4$ |
| Example 5 | 40 | 60 | 100 | Acrylonitrile copolymer | PVDF | LiFePO$_4$ |
| Comparative Example 1 | 5 | 95 | 100 | Acrylonitrile copolymer | PVDF | LiMn$_{0.5}$Fe$_{0.5}$PO$_4$ |
| Comparative Example 2 | 90 | 10 | 100 | Acrylonitrile copolymer | PVDF | LiMn$_{0.5}$Fe$_{0.5}$PO$_4$ |
| Comparative Example 3 | 60 | 120 | 180 | Acrylonitrile copolymer | PVDF | LiMn$_{0.5}$Fe$_{0.5}$PO$_4$ |
| Comparative Example 4 | 40 | 60 | 100 | PVDF | PVDF | LiMn$_{0.5}$Fe$_{0.5}$PO$_4$ |
| Comparative Example 5 | 40 | 60 | 100 | Acrylonitrile copolymer | Acrylonitrile copolymer | LiMn$_{0.5}$Fe$_{0.5}$PO$_4$ |
| Comparative Example 6 | 40 | 60 | 100 | PVDF | PVDF | LiMnO$_4$ |

TABLE 2

|  | Bending test | Press test | Capacity measurement [mAhg$^{-1}$] | Rate test [%] | Cycle test |
|---|---|---|---|---|---|
| Example 1 | ○ | ○ | 810 | 80 | 99 |
| Example 2 | ○ | ○ | 760 | 84 | 99 |
| Example 3 | ○ | ○ | 850 | 71 | 98 |
| Example 4 | ○ | ○ | 845 | 75 | 98 |
| Example 5 | ○ | ○ | 830 | 90 | 99 |
| Comparative example 1 | ○ | 60 MPa | — | — | — |
| Comparative example 2 | 8 mm | ○ | — | — | — |
| Comparative example 3 | ○ | ○ | 860 | 51 | 85 |
| Comparative example 4 | ○ | 40 MPa | — | — | — |
| Comparative example 5 | 10 mm | ○ | — | — | — |
| Comparative example 6 | ○ | ○ | 870 | 91 | 95 |

According to the present invention, electron conductivity can be improved even when the polyanion cathode active material in which electrons are delocalized is used, thereby allowing the discharge amount to be made large.

According to the present invention, it can be prevented that the adhesiveness between the cathode active materials or between the current corrector and the cathode active material may be decreased, even when the specific surface area of the polyanion cathode active material is made large by making the particle size thereof small or by covering the polyanion cathode active material with carbon.

According to the present invention, it can be prevented that the cathode mixture layer may peel from the current collector in the electrode production process and during use of the battery. Further, the battery can be easily produced.

According to the present invention, the oxidation resistance of the binder can be improved and peeling of the cathode mixture layer can be prevented.

According to the present invention, the cathode with the cathode mixture layer having all of binding force, oxidation resistance and flexibility can be produced.

What is claimed is:

1. A cathode for a secondary lithium battery, the cathode comprising:
   a current collector; and
   a cathode mixture layer formed on a surface of the current collector,
   wherein the cathode mixture layer is formed in two layers of a first layer and a second layer, each of which contains a cathode active material, a conductive material and a binder, the first layer is in contact with the current collector, and the second layer is formed on the first layer, and
   wherein the binder that composes the first layer contains a polymer formed by polymerizing at least one of monomers consisting of a monomer derived from 1-olefin and a monomer derived from a vinyl compound, and
   wherein the binder that composes the second layer contains a fluorine resin.

2. The cathode according to claim 1,
   wherein the cathode active material contains a lithium-containing composite oxide that forms a polyanion.

3. The cathode according to claim 1,
   wherein the cathode active material contains a lithium-containing compound oxide phosphate having an olivine structure which is represented by $LiMPO_4$ (where M is one or more elements selected from the group consisting of Li, Fe, Ni, Co, Ti, Cu, Zn, Mg and Zr).

4. A cathode for a secondary lithium battery, the cathode comprising:
   a current collector; and
   a cathode mixture layer formed on a surface of the current collector,
   wherein the cathode mixture layer is formed in two layers of a first layer and a second layer, each of which contains a cathode active material, a conductive material and a binder, the first layer is in contact with the current collector, and the second layer is formed on the first layer, and
   wherein the binder that composes the first layer contains a copolymer of acrylonitrile and acrylic acid ester, and the binder that composes the second layer contains polyvinylidene fluoride.

5. The cathode according to claim 1,
   wherein the thickness of the first layer is within a range of 15 to 60 μm and the total thickness of the first layer and the second layer is within a range of 80 to 150 μm.

6. A secondary lithium battery using the cathode according to claim 1.

* * * * *